United States Patent
Williams et al.

(10) Patent No.: US 8,657,984 B1
(45) Date of Patent: Feb. 25, 2014

(54) METHOD FOR FABRICATING COMPOSITE GRID-STIFFENED STRUCTURES WITH INTEGRATED FLUID CHANNELS

(75) Inventors: Andrew D. Williams, Tijeras, NM (US); Richard Lee Underwood, Jr., Albuquerque, NM (US); Greg Thomas Busch, Albuquerque, NM (US)

(73) Assignee: The United States of America as Represented by the Secretary of the Air Force, Washington, DC (US)

( * ) Notice: Subject to any disclaimer, the term of this patent is extended or adjusted under 35 U.S.C. 154(b) by 635 days.

(21) Appl. No.: 12/843,160

(22) Filed: Jul. 26, 2010

(51) Int. Cl.
 *B32B 3/20* (2006.01)
(52) U.S. Cl.
 USPC .......................................................... 156/245
(58) Field of Classification Search
 USPC .......................................................... 156/245
 See application file for complete search history.

(56) References Cited

U.S. PATENT DOCUMENTS

| | | | |
|---|---|---|---|
| 4,086,378 A * | 4/1978 | Kam et al. | 428/34.5 |
| 4,443,059 A * | 4/1984 | Wells | 359/845 |
| 5,300,367 A | 4/1994 | Bodard | |
| 5,505,256 A * | 4/1996 | Boardman et al. | 165/166 |
| 5,506,032 A * | 4/1996 | Rowe | 428/178 |
| 5,829,716 A * | 11/1998 | Kirkwood et al. | 244/117 R |
| 6,007,894 A | 12/1999 | Barnes | |
| 6,110,567 A | 8/2000 | Bird | |
| 6,149,851 A | 11/2000 | Deckers | |
| 6,245,274 B1 * | 6/2001 | Huybrechts et al. | 264/257 |
| 6,701,200 B1 * | 3/2004 | Lukis et al. | 700/98 |
| 7,097,731 B2 | 8/2006 | Puriefoy | |
| 7,479,201 B1 | 1/2009 | Wegner | |
| 2008/0003145 A1 * | 1/2008 | Nurse et al. | 422/99 |
| 2009/0197050 A1 * | 8/2009 | Pridie | 428/174 |

FOREIGN PATENT DOCUMENTS

| | | | |
|---|---|---|---|
| EP | 136096 A2 * | 4/1985 | |
| JP | 62240543 A * | 10/1987 | |

OTHER PUBLICATIONS

U.S. Appl. No. 12/049,474, filed May 17, 2008, Williams.
Williams, A.D. et al, "Biologically Inspired Multifunctional Composite Panel with Integrated Circulatory System for Thermal Control," Int. Conf. Composite Mat., Jul. 28, 2009.
Williams, A. D. et al, "Biologically Inspired Multifunctional Composite Panel with Integrated Thermal Control," AIAA-2010-2934, 2010.

* cited by examiner

*Primary Examiner* — Philip Tucker
*Assistant Examiner* — Vicki Wu
(74) *Attorney, Agent, or Firm* — James M. Skorich; Kenneth E. Callahan

(57) ABSTRACT

A method for fabricating a grid-stiffened panel which incorporates a network of fluid channels and passageways into the ribs and face sheet is described. The method is comprised of a base tooling assembly, an expansion tooling assembly, a composite prepreg, plugs, a face sheet and a network of valves and pumps, wherein the prepreg is draped over said expansion tooling and assembled with the base tooling assembly to form a rib structure. Channel plugs are placed therein such that gaps between adjacent expansion tooling blocks are filled, and the entire rib structure assembly is autoclaved. The face sheet may be comprised of a plurality of layers, whereby channels are machined into the lower layer(s). The upper layer(s) are bonded to the lower layer(s) to seal the channels, and said face sheet is bonded to the rib structure.

15 Claims, 8 Drawing Sheets

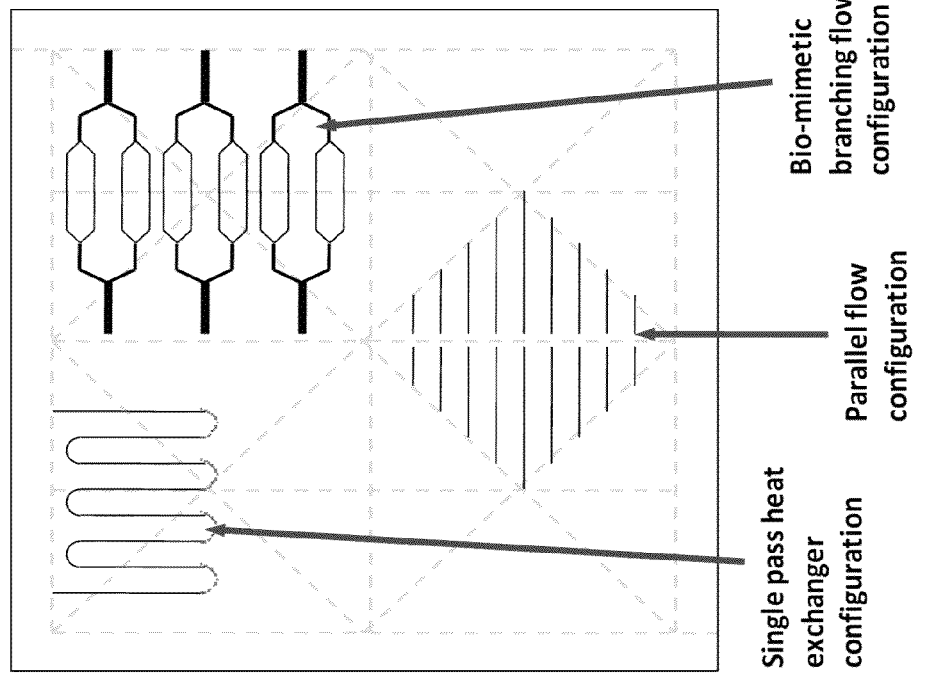
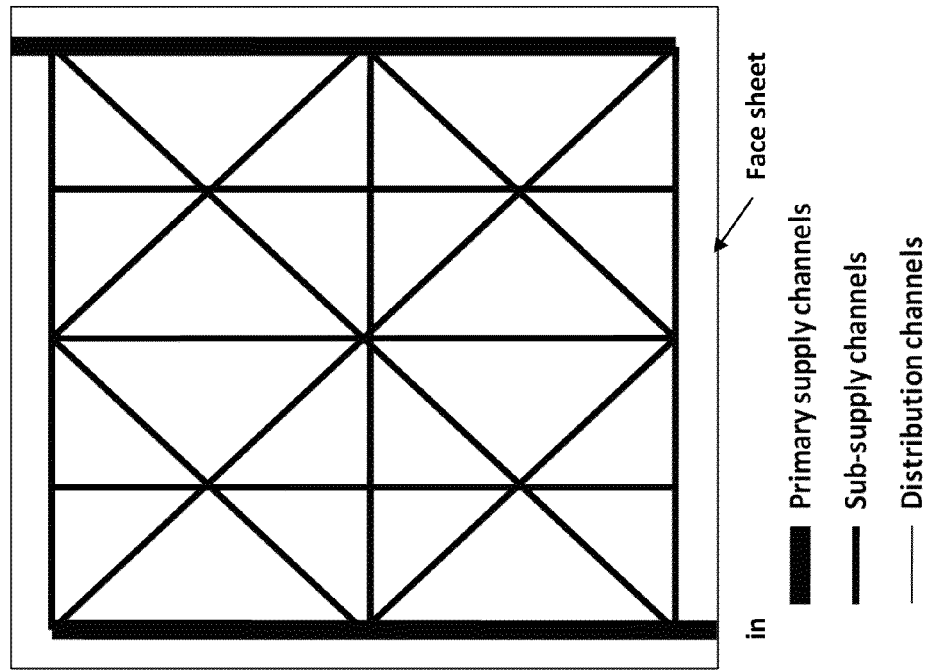

METHOD FOR FABRICATING COMPOSITE GRID-STIFFENED STRUCTURES WITH INTEGRATED FLUID CHANNELS

STATEMENT OF GOVERNMENT INTEREST

The conditions under which this invention was made are such as to entitle the Government of the United States under paragraph 1(a) of Executive Order 10096, as represented by the Secretary of the Air Force, to the entire right, title and interest therein, including foreign rights.

BACKGROUND OF THE INVENTION

The present invention relates generally to thermal management systems, and more specifically to a method of fabricating a structural panel with an integrated pumped-fluid loop thermal management system while maintaining the panel's stiffness-to-mass ratio.

Due to the vacuum of the space environment, traditional spacecraft thermal control techniques usually rely upon conduction and radiation to dissipate and reject heat generated by on-board electronic equipment. The spacecraft is designed such that a conduction path exists between each electronic component, the spacecraft bus, and a radiator outside the spacecraft, which radiates the electronics' waste heat to space. Unfortunately, the amount of heat which can be dissipated and rejected using this approach is severely limited, and it is difficult to efficiently transfer this heat over large distances. To maximize the effectiveness of this approach, electronic components are often mounted on the inside of a spacecraft structural panel. The outside of the panel serves as a radiator to space. Heat is conducted from the electronic components, through the panel, and to the radiator where it is rejected to space. This approach minimizes the distance over which the heat must be transported but severely restricts the placement of the electronic components within the spacecraft. Additionally, the amount of heat that can be removed before the component overheats is limited due to the relatively high thermal resistance of the structural panel. Several other technologies have been developed to help overcome these limitations. For example, heat pipes, loop heat pipes, and capillary-pumped loops are two-phase heat transfer devices that can transport significantly more heat a farther distance than most solid materials which rely on conduction alone. However, each of these devices adds a significant amount of weight and volume to the system. They also tend to be complicated and expensive and need to be custom designed for each spacecraft.

Additionally, the power levels of electronic components aboard spacecraft have risen dramatically over the years and will continue to do so in the future, while at the same time, spacecraft are becoming smaller and more compact. The result is much higher heat flux densities that must be dissipated by the thermal control system. These high densities can sometimes be mitigated using a thermal doubler to help spread the heat over a larger area, but doublers are not always sufficient and in some cases traditional techniques are inadequate to dissipate such fluxes. For example, state-of-the-art loop heat pipes are limited to heat flux capacities in the tens of watts per square centimeter, but many next-generation electronic components are expected to generate fluxes in the hundreds of watts per square centimeter. Other techniques, such as pumped fluid loops, may achieve considerably higher capacities, but to date these systems have added a significant amount of weight and complexity to the spacecraft thermal control system and have suffered from reliability issues.

Finally, the requirement to manage this increase in power and heat flux is compounded by the desire for modular, reconfigurable, and rapidly-deployable spacecraft. None of the aforementioned thermal management techniques meet these requirements, as each must be tailored to a specific application. The demands for higher power dissipation with increased heat flux capacity while being rapidly designed and integrated into a spacecraft bus are stretching the performance limits of traditional thermal management techniques. New technologies are required that can satisfy the thermal requirements of next-generation spacecraft without adding a significant amount of mass or volume to the thermal management system. One proposed technology that shows promise is addressed in U.S. patent application Ser. No. 12/049,474 filed Mar. 17, 2008 entitled, "Grid-stiffened Panel with Integrated Channels," which discloses a grid-stiffened panel with fluid channels integrated in such a way as to preserve the original stiffness-to-mass ratio of the panel. A method for fabricating such a panel using composite materials is disclosed herein.

SUMMARY

To address the issues of mass, re-configurability, power, and flux capacity in spacecraft thermal management systems, a method of fabrication is disclosed herein by which a pumped-fluid loop thermal management system with variable flow properties is integrated into the ribs and face sheet of a low-mass structural panel. This is done by fabricating the panel in such a way as to preserve its original stiffness while not adding any mass. With this technique, variable heat transfer rates characteristic of pumped-fluid loops may be obtained by altering, for example, the flow rate of fluid through the panel. This will enable a single panel design to be used with assorted electronics components and configurations, allowing the system to be rapidly integrated into a satellite bus.

The multifunctional nature of the panel was inspired by the circulatory system of biological organisms, which maintains temperature, distributes oxygen, promotes self-healing, and improves the physical properties of structural tissue. The geometry of a conventional structural panel is modified by incorporating supply channels into the ribs of the panel. These supply channels feed smaller distribution channels embedded in the panel face sheet. The supply channels are analogous to the arteries in a circulatory system, providing relatively large fluid flow rates at low pressure drop. The channels embedded in the face sheet are analogous to capillaries, providing a large surface area through which heat transfer may occur. A network of pumps and valves are used to control the flow rate and flow path of the fluid, similar to the heart and valves found in many living organisms.

A novel method of fabricating such a panel is disclosed in which layers of uncured composite prepreg (prepreg is a term for "pre-impregnated" composite fibers) are draped over a plurality of expansion tooling blocks. Plugs, which act to seal gaps in the channels and may serve as mounting surfaces for pumps and valves, may be placed among the prepreg/expansion tooling assembly where required. The prepreg, plug, and expansion tooling block assembly are placed inside a base tooling assembly, which is comprised of a material with low or predictable thermal stability. The draping of the prepreg over the individual expansion tooling blocks and the subsequent assembly of these blocks is unique to the disclosed fabrication process and a key step in producing the desired final product. The entire assembly is either bagged or enclosed with a cover plate and autoclaved to cure the prepreg and bond the plugs. A face sheet with embedded channels is then placed on top of the cured structure and used to seal the integrated channels which result from the previously described process. The face sheet may consist of a plurality of prepreg layers, the inner layers of which may be machined to contain the desired distribution channel geometry. In this embodiment, the outer layers act to seal these embedded channels, with inlet and outlet openings machined where desired so that flow may pass between the distribution and supply channels. In an alternative embodiment, fluid channels may be machined in the top portion of the structural ribs. The result of this novel fabrication process is a low-mass, high-stiffness structural panel with integrated fluid passageways that may provide improved thermal performance over existing thermal management systems by providing a variable and increased effective thermal conductivity of the panel and heat removal rate from the panel.

BRIEF DESCRIPTION OF THE DRAWINGS

FIG. 1A is a schematic of some representative embodiments of the panel illustrating key features such as the primary supply and sub-supply channels.

FIG. 1B illustrates some possible configurations of the distribution channels.

DETAILED DESCRIPTION OF THE INVENTION

Figure 2:
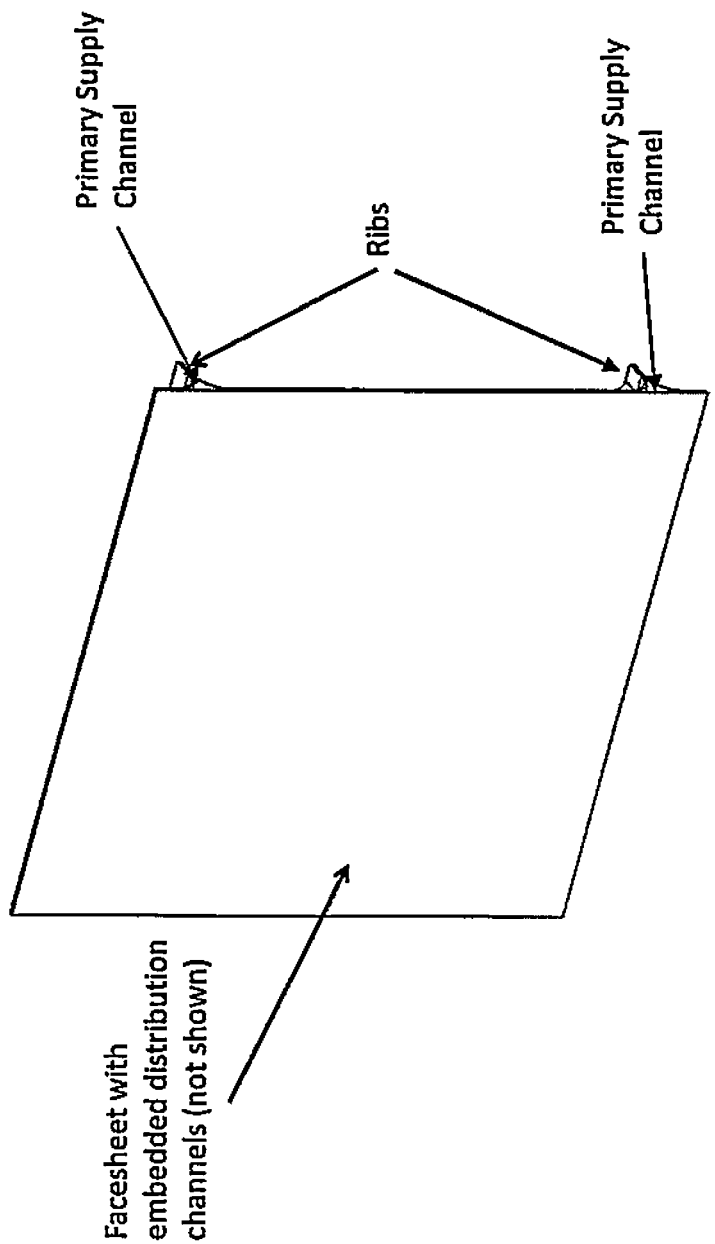
FIG. 2 is a front view of the top of the panel showing the top face sheet of the panel that covers and seals the embedded primary and sub-supply channels.

As discussed above, the disclosed invention is a method of fabricating a structural panel comprised of a series of primary supply, sub-supply, and distribution channels incorporated in the panel ribs and face sheet, and also a network of pumps and valves which control the flow of the working fluid through the panel. As a result of the requirements for low mass and complex geometry with internal channels, the preferred material of the grid-stiffened panel is carbon-fiber composite, but other embodiments could include structures composed of fiberglass or other composites.

Similar technologies have used heat pipes or cooling tubes embedded in structural panels (Rowe, N. C., "Structural Panel Having Integral Heat Pipe Network," U.S. Pat. No. 5,506,032, issued Apr. 9, 1996 and Bodart, E. D., and Morgenthaler, G. T., "Metallic Structural Panel and Method of Fabrication," U.S. Pat. No. 5,300,367, Apr. 5, 1994). The first of these technologies, disclosed in Rowe, addresses the integration of heat pipes, a passive two-phase cooling system whose operation differs fundamentally from the single-phase pumped fluid system described herein, into a honeycomb sandwich panel, and as such, utilizes a different manufacturing procedure than that disclosed presently. The second of these technologies, described in Bodart, incorporates a single-phase pumped-fluid system, such as that described herein, into a metallic sandwich panel. It differs from the currently disclosed process in that ribs divide the fluid passages, necessitating a face sheet on both sides of the ribs, whereas the current fabrication process incorporates the fluid channels within the ribs. This enables the use of a face sheet on only one side of the rib structure. Additionally, the metallic structural panel in Bodart is fabricated using a super plastic deformation and diffusion bonding process, which precludes the use of composites. Conversely, the process disclosed herein requires the use of composite, rather than metallic, materials.

Other methods of fabricating grid-stiffened panels cannot produce structures with integrated cooling channels (Huybrechts, S. M., Meink, T. E., and Underwood, Jr., R. L., "Method for Making Advanced Grid-Stiffened Structures," U.S. Pat. No. 6,245,274B1, Jun. 12, 2001, Deckers, M. E., Benson, V. M., McCloy, M. R., and Rosevear, T. A., "Tooling Apparatus and Method for Producing Grid-Stiffened Fiber Reinforced Structures," U.S. Pat. No. 6,149,851, Nov. 21, 2000., Barnes, D. C., Kusek, S. M., Wegner, P. M., Ganely, J. M., Johnson, B. A., and Van West, B. P., "Method for Fabricating Rib-Stiffened Composite Structures," U.S. Pat. No. 7,479,201B1, Jan. 20, 2009, and Lascola, D. A., "Quasi-Isotropic Composite Isogrid Structure and Method of Making Same," U.S. Pat. No. 6,007,894, Dec. 28, 1999.) These methods produce solid rib structures with no available flow paths, and they cannot be readily adapted to provide a flow network throughout the structure. Other methods which may produce structures with hollow ribs (such as those disclosed in Puriefoy, M. and Halsey, M. D., "Method of Manufacturing a Hollow Section, Grid Stiffened Panel," U.S. Pat. No. 7,097,731B2, Aug. 29, 2006, and Bird, C., "Composite Structural Panel Having a Face Sheet Reinforced with a Channel Stiffener Grid," U.S. Pat. No. 6,110,567, Aug. 29, 2000) work for simple rib patterns, but are not appropriate for more complicated rib geometries, such as the exemplary configuration discussed in this disclosure, as they would lead to excessive fabric wrinkle, unknown fiber orientation, and reduced dimensional tolerances. Therefore, the novel fabrication method described in this disclosure is required.

The product of one embodiment of the disclosed invention is illustrated schematically in FIG. 1A, and will be described in detail to improve understanding of the fabrication process. The back of the panel consists of an isogrid rib structure, in which supply channels are integrated. Other embodiments could include differing rib patterns. Fluid enters one of the primary supply channels, for example, near the bottom (left) edge of the panel, and flows throughout the channel network, eventually exiting the panel at the flow exit, which may be, for example, located near the top (right) edge of the panel, as shown in FIG. 1A. The panel ribs are connected to a face sheet, shown in FIG. 1B, in which smaller distribution channels may be embedded to enhance heat transfer with components that may be mounted to the panel. A variety of embodiments of the distribution channel layout exist, and three are illustrated in FIG. 1B. These include a single serpentine channel, as in a single-pass heat exchanger, a parallel flow configuration, or a bio-mimetic branching flow configuration.

The optimal distribution channel configuration will be application dependent, but all are intended to improve the heat transfer characteristics of the structural panel.

The face sheet of the structural panel is also shown in FIG. 2. The distribution channels embedded in the face sheet are not visible on the top surface of the face sheet (the side away from the ribs), thereby providing a smooth surface on which to mount electronic components, radiate heat away from the panel, or perhaps mate to another surface. The face sheet alone provides little resistance to bending and torsion loads; these loads are passed through structural ribs, portions of which are also shown in FIG. 2.

Figure 3:
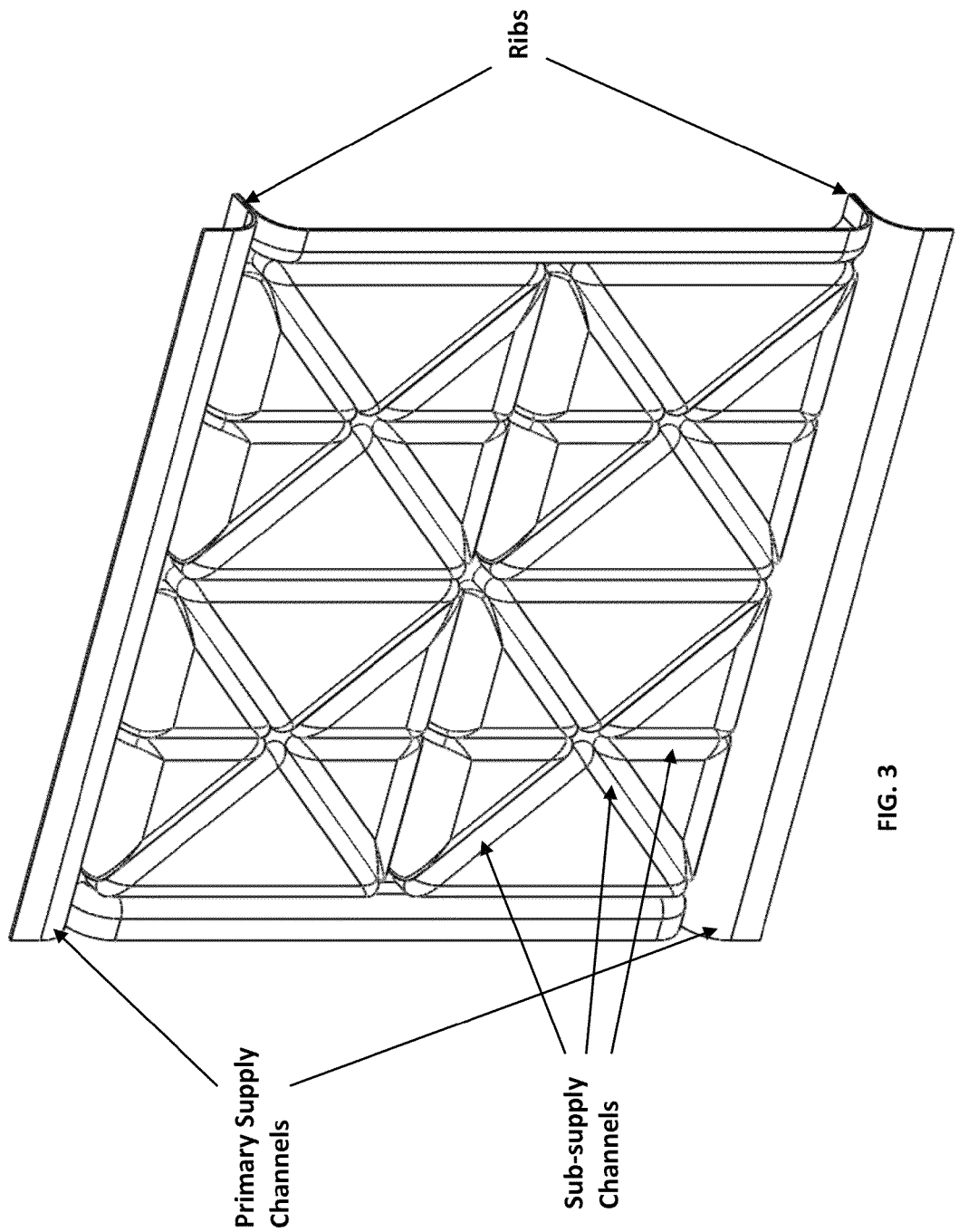
FIG. 3 is a front view of the top of the panel with the face sheet removed.
Figure 4:
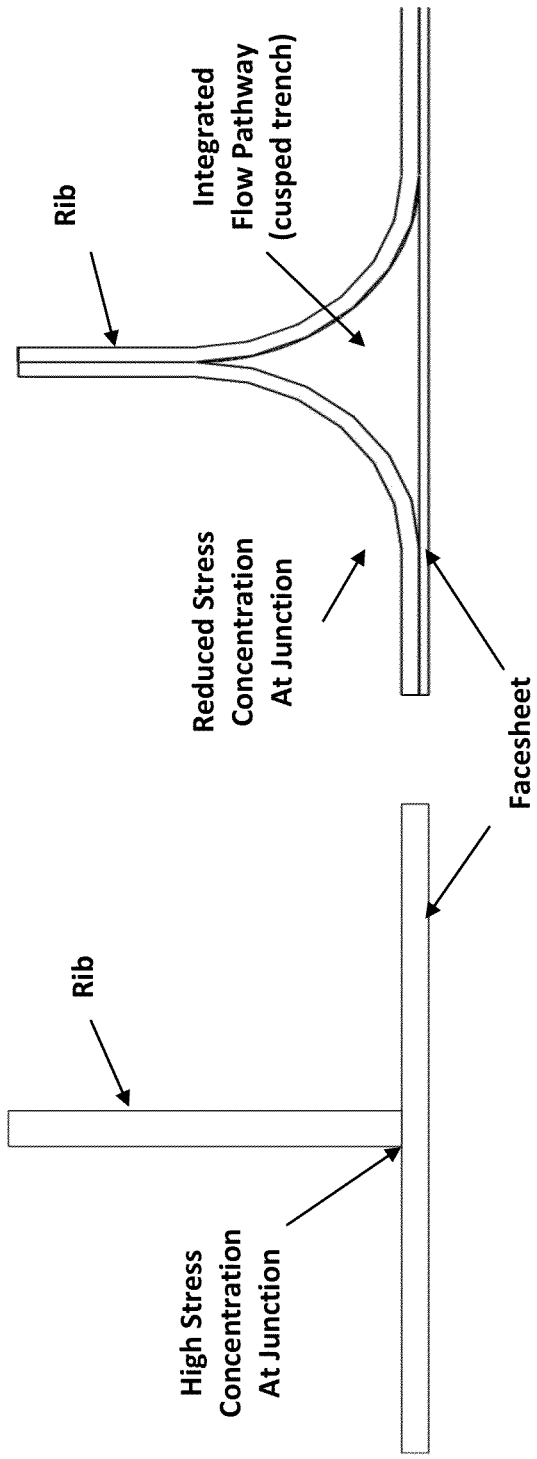
FIG. 4A is a cross-sectional view of a traditional junction between rib and face sheet of an isogrid panel such as found in the U.S. patent application Ser. No. 12/049,474 reference.
FIG. 4B is a cross-sectional view of the rib/face sheet junction of the present invention.

The face sheet forms one wall of the supply channels integrated into the ribs (FIG. 2). These supply channels can be better seen in FIG. 3, which is essentially the same view as in FIG. 2 but with the face sheet removed. Large cross-sectional area primary supply channels, labeled in FIG. 3, give the necessarily high flow rates to provide flow to the larger number of sub-supply channels while maintaining relatively low flow velocities to reduce pressure loss and the power required to pump the fluid through the panel. The channels are formed by filleting each of the ribs near the face sheet junction in such a way as to create a cusped trench (FIG. 4B). When the face sheet is applied, it seals the trench and completes the channel geometry. These fillets not only form the fluid channels but also greatly eliminate the stress concentrations that exist where the ribs are bonded perpendicularly to the face sheet of other grid-stiffened panels, such as that of FIG. 4A. This joint is typically the weakest part of a conventional isogrid structure. Thus, the disclosed geometry has the potential to provide improved strength over the fabrication technique described in U.S. Pat. No. 6,245,274B1 while simultaneously incorporating flow pathways.

Figure 5:
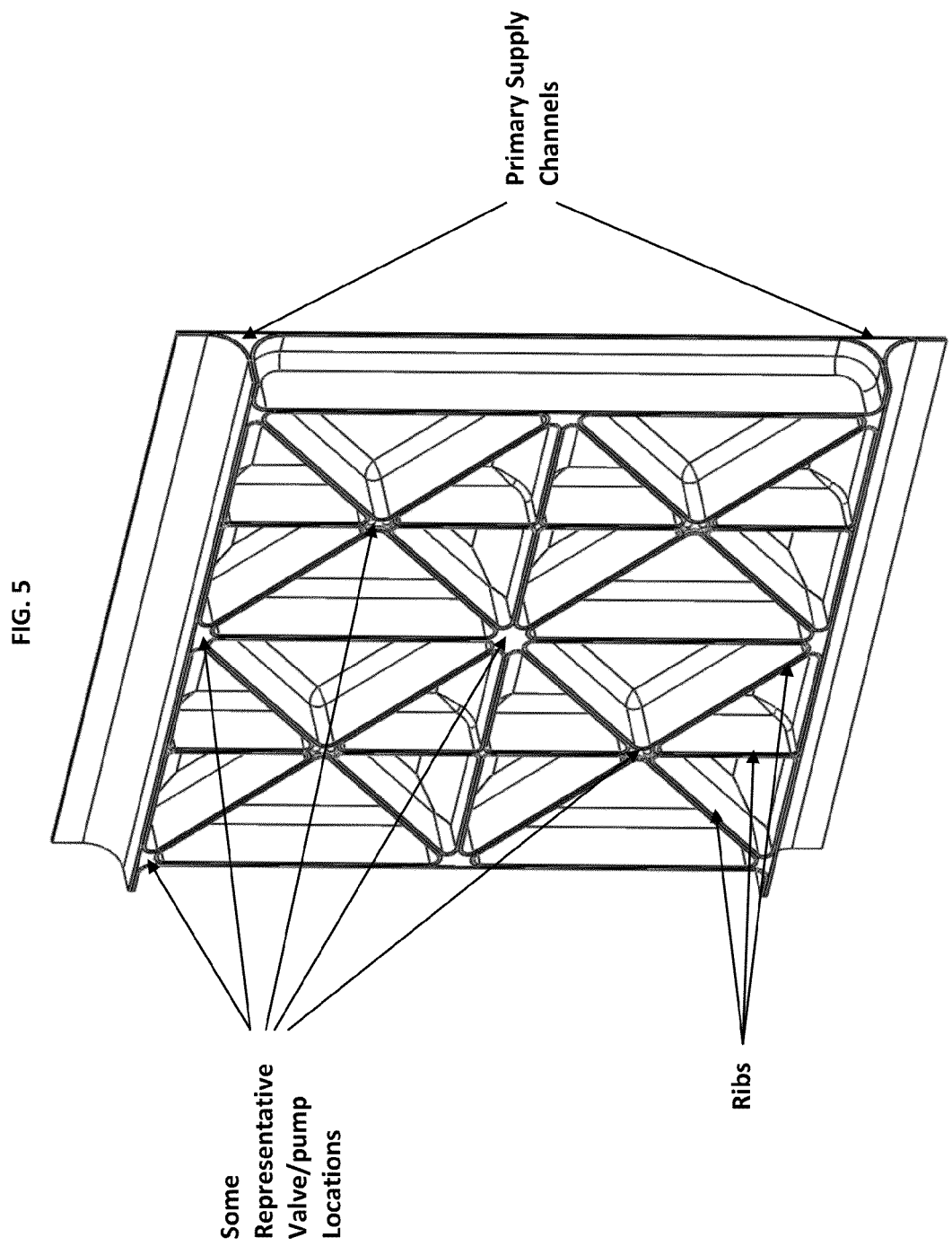
FIG. 5 is a rear view of FIG. 3 showing the structure of the stiffening ribs on the underside of the panel and possible locations for flow control valves or pumps.

To control the flow of fluid through the structural panel, a system of at least one pump or valve may be used. In most embodiments, a plurality of valves will be used with at least one pump. These valves may serve one of several functions, including flow rate control, flow directional control, or thermal control. The pump(s) will provide power to propel the fluid through the supply and distribution channels, and may also be used to provide control over flow rate and direction. Some representative locations where valves or pumps may be incorporated are indicated in FIG. 5. In most applications, the preferred placement of the valves and pumps would be in some of the nodes where the supply channels meet, but some applications may also call for placement of pumps or valves in the center of a supply channel, away from any nodes. Controlling the flow will be especially important for varying the heat transfer characteristics of the panel (e.g., increasing or decreasing its effective thermal conductivity or altering the amount of heat carried away from the panel by the working fluid). This may include increasing flow rates in areas of the panel where high power components are mounted or decreasing flow rates where components are low power or turned off, or routing fluid around channels which have been damaged and may be leaking. A passive valve system is the preferred embodiment, whereby a thermally-activated valve opens and increases flow rate through the panel when the panel temperature rises above a certain level. Of course, actively operated valves (which require a control signal or power) may be incorporated into the panel as well.

Figure 6:
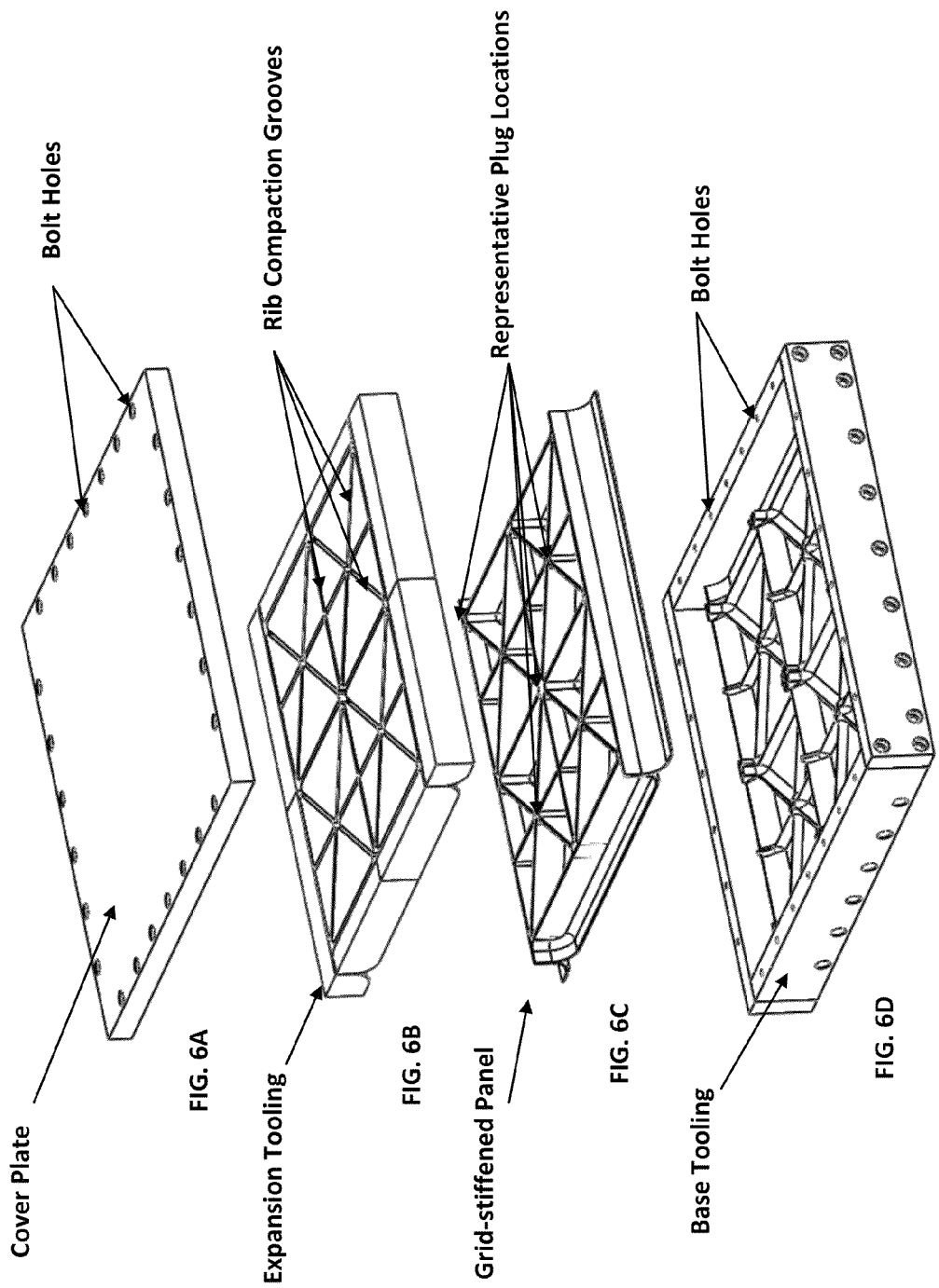
FIG. 6 shows an exploded view (FIG. 6A-6D) of the grid-stiffened panel and the mold/mandrel assembly used to create the panel, with individual components identified.

A novel process of fabrication for creating the structural panel is now disclosed. A set of expansion tooling blocks and base tooling are required for fabrication, as shown in FIG. 6. The uncured composite prepreg, along with any plugs which may be required to seal gaps in the channels or to act as mounting surfaces for pumps or valves, are placed between the base and expansion tooling to form the rib structure assembly, and said assembly is enclosed with a cover plate or bagged for autoclaving. Once the rib structure is cured, it is removed from the base and expansion tooling assemblies. Separately, a face sheet is constructed consisting of a single or a plurality of layers. The layer(s) that comprise the lower, or inner, portions of the face sheet are machined to have a network of grooves, which ultimately form the distribution channels. The lower portions of the face sheet are also machined to include flow inlets/exits so that fluid may move from the supply channels to the distribution channels. The layer(s) that comprise the top, or outer, portion of the face sheet do not contain said grooves, and are bonded to the lower or inner layers to seal the channels embedded therein. After curing of the face sheet, it is bonded to the top of the rib structure, where it seals the supply channels which have been integrated therein. Valves and pumps can then be mounted to the structure. The base and expansion tooling sets can generally be reused to create additional copies, depending on the material of which they are comprised, though some degradation to the tooling may occur after repeated use.

The base tooling is typically machined and is the component of the tooling assembly which predominantly determines the final geometry of the cured structure. It should be fabricated from a thermally stable material with a predictable temperature response. Some example materials include graphite, ceramic, wood, tooling foam, tooling epoxy, steel, aluminum, or metal. Desired base tooling material properties include low cost, low coefficient of thermal expansion, good machinability, reasonably low weight, and the ability to withstand the large temperature gradients associated with the curing process without excessive deformation so that the tooling may be reused. In one embodiment, the material is selected such that it is easy to separate from the composite structure. In a second embodiment, a mold-release agent is applied to the base tooling to enable easy separation of composite structure from said tooling. The base tooling assembly is generally machined to provide the desired part geometry, and may consist of several components depending on the part's complexity. These components may be bolted together, as in the embodiment of FIG. 6, or bonded. The embodiment of FIG. 6 also shows a cover plate that bolts onto the top of the base tooling assembly. A second embodiment would be the replacement of the cover plate with a vacuum bag for autoclaving.

The expansion tooling is used to compact the prepreg into the base tooling, ensuring that the part has the desired geometry determined by the base tooling. In contrast to the base tooling material, the material comprising the expansion tooling should have a very high coefficient of thermal expansion. Silicon rubber, specifically AirTech AirCast 3700, has been the material of choice for the expansion tooling. An additional benefit of this material is that it provides good part release, easing the removal of the expansion tooling from the cured composite panel. The geometry of the expansion tooling should be matched to that of the base tooling and desired part geometry such that it will mate easily while still imparting good compaction to the panel ribs during cure. Typically, the desired geometry of the expansion tooling blocks is obtained using a traditional molding process.

Figure 7:
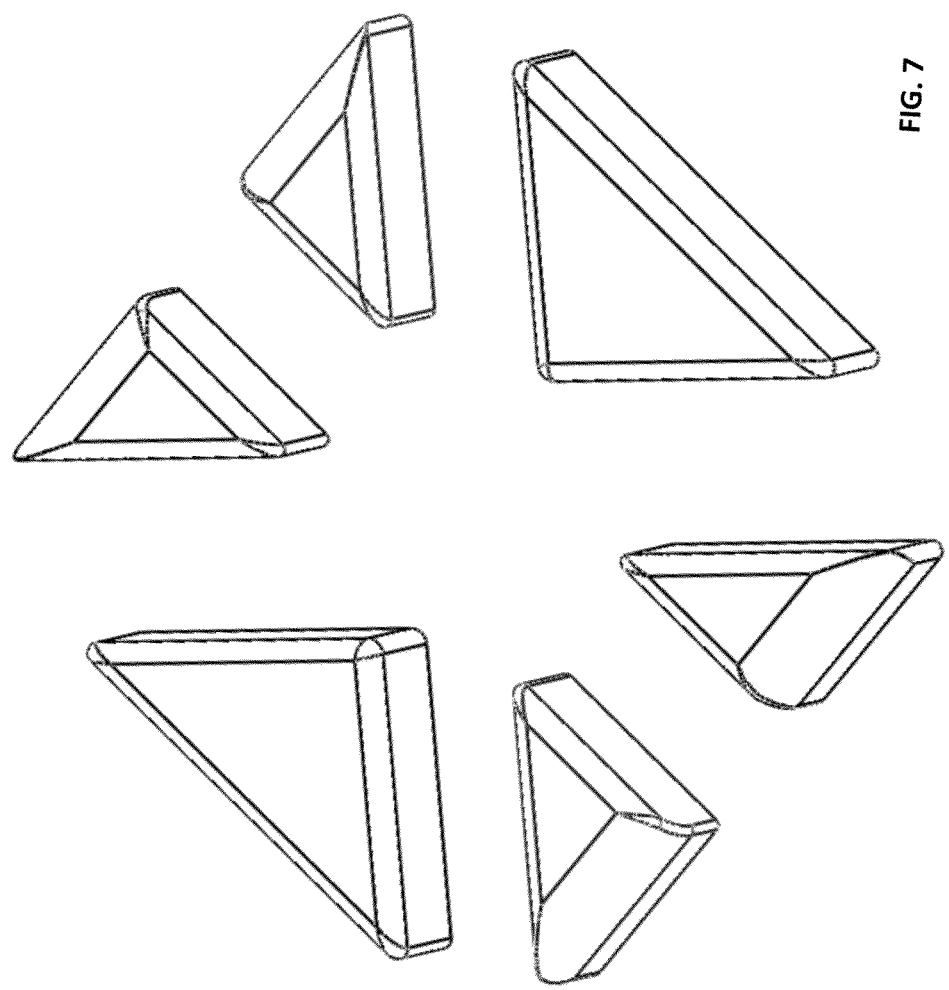
FIG. 7 is a schematic of one embodiment of a set of expansion tooling blocks before being draped with prepreg and placed in the base tooling assembly.

One representative embodiment of a set of expansion tooling blocks is shown in FIG. 7. Uncured prepreg is draped over each triangular block, such that the prepreg covers all sides of the block except the bottom (which is the only side with edges that are not filleted). The expansion tooling blocks are then assembled in the base tooling fixture, such that the prepreg remains between the expansion and base tooling. These steps are key elements of the disclosed fabrication process, and distinguish it from all other methods described in the literature. In the preferred embodiment, de-bulking blocks are used to pre-compress the prepreg before assembling the expansion tooling blocks, enabling easier assembly of the blocks within the base tooling fixture. This procedure causes the prepreg that is draped over the sides of each expansion tooling block to come into contact with prepreg on the sides of other expansion tooling blocks, and with the base tooling assembly. In the illustrated embodiment of FIG. 7, gaps (not labeled in FIG. 7) will exist at the junctions of multiple expansion tooling blocks. Plugs may be required to seal these gaps and prevent fluid leakage, and in the preferred embodiment, would also provide a surface on which to mount pumps or valves once the panel is cured. The plugs are comprised of a material compatible with the composite comprising the panel structure, and are bonded to the composite panel during the curing process. During cure, the expansion tooling will expand moreso than the base tooling, providing compaction of the ribs between the expansion tooling blocks and of the wall of the panel orthogonal to the ribs between the base tooling assembly and the expansion tooling blocks.

Figure 8:
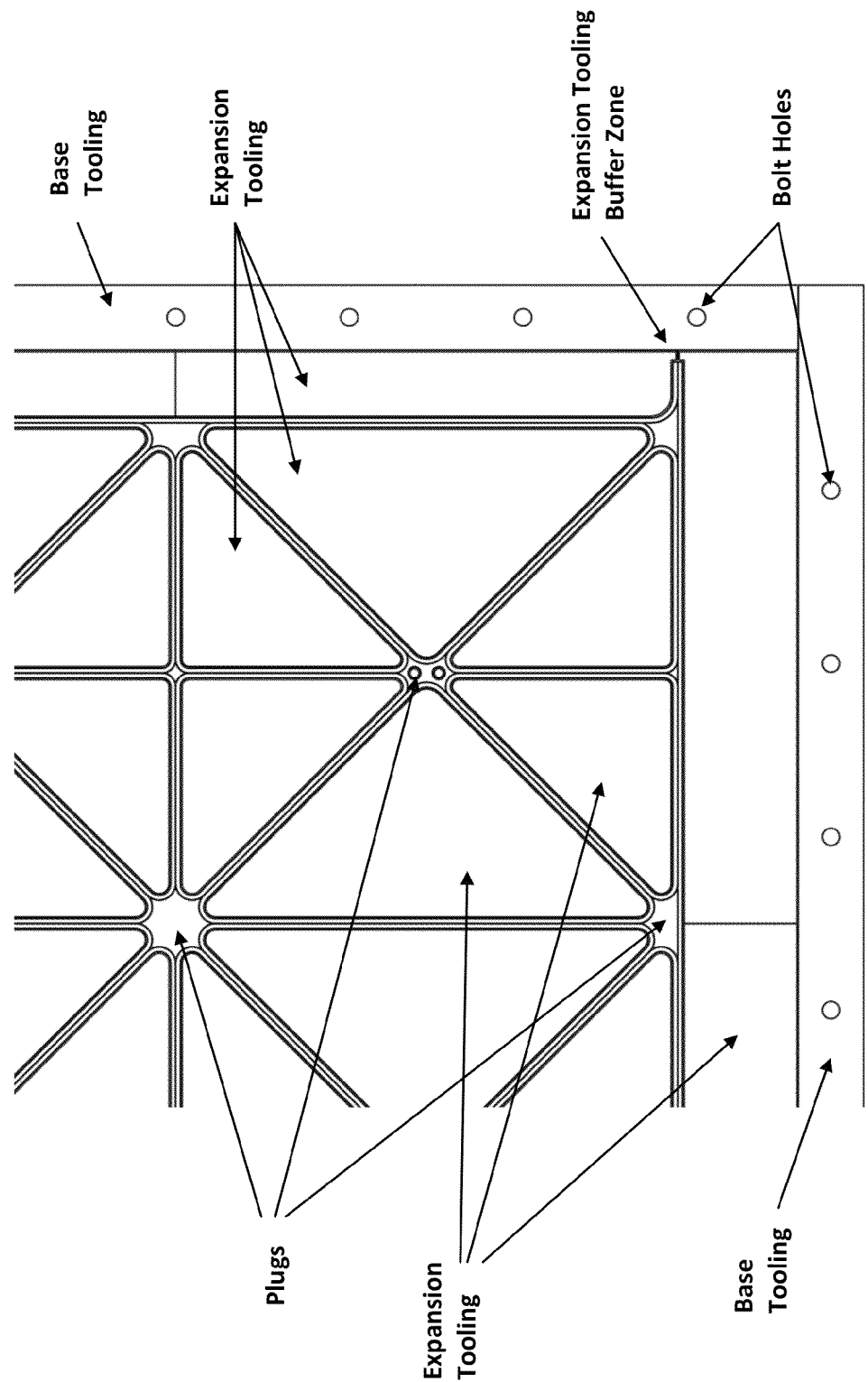
FIG. 8 is a diagram of the assembly of base tooling and expansion tooling with the composite panel structure, highlighting a portion of one embodiment of a buffer zone formed between the base tooling and composite structure that prevents thermal-induced stress on the cured composite panel during post-cure cool down.

An additional function of the expansion tooling blocks is to prevent the base tooling from stressing the cured composite panel during post-cure cool down. If the material from which the base tooling is comprised has a higher coefficient of thermal expansion than does the cured material from which the structural panel is comprised, the base tooling will shrink at a greater rate than will the cured structure during the cool-down process after autoclaving is complete. This may place excessive stress on the cured structure, potentially causing micro-cracking or even panel fracture. To prevent this from occurring, the base tooling should be made of a very low coefficient of thermal expansion material or be prevented from shrinking during cool-down through the design of the base tooling. Alternatively, the expansion tooling can be designed to create a buffer zone which allows for greater base tooling shrinkage than part shrinkage. A portion of one embodiment of a buffer zone is shown in FIG. 8. In this embodiment, the expansion tooling completely envelops the uncured panel structure, such that the only contact between the base tooling and panel occurs on the top of the panel. No contact occurs between the sides of the panel and the base tooling, as the expansion tooling blocks are designed to prevent this. During cure, the expansion tooling provides good compaction to the panel, despite the increasing gap between the base tooling and panel. During cool down, the expansion tooling is compressed between the base tooling and the cured panel, but is sufficiently soft to elastically deform. This reduces the thermally-induced stress on the cured panel and prevents damage.

A face sheet is bonded to the rib structure of the panel after it is cured. The face sheet consists of a plurality of composite layers. The lower layer(s) are fabricated using conventional composite fabrication techniques, and grooves are machined into them to provide the desired network of distribution channels. A passageway for flow to enter and exit the distribution channels from the supply channels integrated into the ribs is also machined. Once machining is complete, the top layer(s) of the face sheet are bonded to the lower layer(s) to seal the channels and provide a smooth top surface for the panel. After the face sheet is complete, it is bonded to the rib structure of the panel in such a manner as to seal the integrated supply channels. Once the structure of the composite panel is complete, a network of pumps and valves may be installed to control the flow through the panel.

The invention claimed is:

1. A method for fabricating a grid-stiffened composite structure for supporting and cooling electronic components comprised of a rib structure with integrated fluid channels and a face sheet, comprising:
   a. milling an aluminum block to form a base tooling assembly;
   b. fabricating a set of expansion tooling blocks having a geometry to fit within said base tooling assembly;
   c. covering the expansion tooling blocks with composite prepreg material;
   d. pre-compressing said prepreg using de-bulking blocks;
   e. placing said expansion tooling blocks covered with said prepreg in the base tooling assembly;
   f. filling any voids between adjacent expansion tooling blocks with plugs;
   g. enclosing the assembly thus formed from said base tooling assembly, the covered expansion tooling blocks, and the plugs with a cover plate or bag;
   h. autoclaving said assembly thus formed to compact and cure said prepreg to form the rib structure of said grid-stiffened composite structure with integrated fluid supply channels;
   i. forming a composite face sheet having a lower layer with machined channels cut into said lower layer to form a looped fluid distribution pattern of a smaller size and spacing than said integrated fluid supply channels of said rib structure to create a surface area through which heat transfer can occur, and having an upper layer comprised of one or more layers configured to accept electronic components requiring support and cooling;
   j. bonding said upper layer to said lower layer to seal said machined channels;
   k. applying said lower layer of said face sheet to said cured rib structure; and
   l. autoclaving said assembly including said face sheet applied to said cured rib structure to cure the bond between said face sheet and said rib structure and to thereby seal the channels integrated into said rib structure in fluid communication with the loop fluid distribution pattern formed in the face sheet to provide for variable fluid flow throughout the assembly and face sheet.

2. The method of claim 1 wherein said base tooling assembly is comprised of graphite, ceramic, wood, tooling foam, tooling epoxy, steel, or aluminum.

3. The method of claim 1 wherein said expansion tooling blocks are comprised of silicon rubber.

4. The method of claim 1 wherein a mold release is applied such that neither said base tooling assembly nor said expansion tooling blocks adhere to said cured rib structure.

5. The method of claim 1 wherein thermal stresses on said cured rib structure are mitigated by selecting a base tooling material with a coefficient of thermal expansion approximating a coefficient of expansion for said cured rib structure.

6. The method of claim 1 wherein thermal stresses on said cured rib structure are mitigated by creating a buffer zone between the expansion tooling blocks and the base tooling assembly.

7. The method of claim 1 wherein the junction between said face sheet and said rib structure is filleted.

8. The method of claim 1 wherein a network of pumps and/or valves is installed between the adjacent expansion tooling blocks in place of the plugs.

9. A method for fabricating a grid-stiffened composite structure for supporting and cooling electronic components comprised of a rib structure with integrated fluid channels and a face sheet, comprising:

a) milling an aluminum block to form a base tooling assembly;
b) fabricating a set of expansion tooling blocks having a geometry to fit within said base tooling assembly;
c) covering the expansion tooling blocks with composite prepreg material;
d) pre-compressing said prepreg using de-bulking blocks;
e) placing said expansion tooling blocks covered with said prepreg in the base tooling assembly;
f) incorporating a network of pumps and/or valves between said adjacent expansion tooling blocks;
g) enclosing the assembly thus formed from said base tooling assembly and the covered expansion tooling blocks with a cover plate or bag;
h) autoclaving said assembly thus formed to compact and cure said prepreg to form the rib structure of said grid-stiffened composite structure with integrated fluid supply channels;
i) forming a composite face sheet having a lower layer with machined channels cut into said lower layer to form a looped fluid distribution pattern of a smaller size and spacing than said integrated fluid supply channels of said rib structure to create a surface area through which heat transfer can occur, and having an upper layer comprised of one or more layers configured to accept electronic components requiring support and cooling;
j) bonding said upper layer to said lower layer to seal said machined channels;
k) applying said lower layer of said face sheet to said cured rib structure; and
l) autoclaving said assembly including said face sheet applied to said cured rib structure to cure the bond between said face sheet and said rib structure and to thereby seal the channels integrated into said rib structure in fluid communication with the loop fluid distribution pattern formed in the face sheet to provide for variable fluid flow throughout the assembly and face sheet.

10. The method of claim 9, wherein said base tooling assembly is comprised of graphite, ceramic, wood, tooling foam, tooling epoxy, steel, or aluminum.

11. The method of claim 9, wherein said expansion tooling blocks are comprised of silicon rubber.

12. The method of claim 9, wherein a mold release is applied such that neither said base tooling assembly nor said expansion tooling blocks adhere to said cured rib structure.

13. The method of claim 9, wherein thermal stresses on said cured rib structure are mitigated by selecting a base tooling material with as coefficient of thermal expansion approximating a coefficient of expansion for said cured rib structure.

14. The method of claim 9, wherein thermal stresses on said cured rib structure are mitigated by creating a buffer zone between the expansion tooling blocks and the base tooling assembly.

15. The method of claim 9, wherein the junction between said face sheet and said rib structure is filleted.

* * * * *